(12) United States Patent
Trauernicht et al.

(10) Patent No.: US 6,928,959 B1
(45) Date of Patent: Aug. 16, 2005

(54) MULTI-SEGMENTED DEPLOYABLE ARCHED RAMP

(76) Inventors: Catherine Trauernicht, 7913 Coach St., Potomac, MD (US) 20854; Mark T. MacLean-Blevins, 679 Arbor Dr., Westminster, MD (US) 21158-1450

(*) Notice: Subject to any disclaimer, the term of this patent is extended or adjusted under 35 U.S.C. 154(b) by 15 days.

(21) Appl. No.: 10/785,040

(22) Filed: Feb. 25, 2004

(51) Int. Cl.[7] .................. A01K 29/00; B65G 69/28
(52) U.S. Cl. ........................ 119/847; 14/69.5
(58) Field of Search .................. 119/843, 847; 14/69.5, 71.1; D30/119

(56) References Cited

U.S. PATENT DOCUMENTS

| | | | |
|---|---|---|---|
| 4,601,079 A | 7/1986 | Corica | |
| 4,815,155 A | 3/1989 | Sommers | |
| 5,062,174 A | 11/1991 | DaSalvo | |
| 5,282,692 A | 2/1994 | McLeod | |
| 5,347,672 A | 9/1994 | Everard et al. | |
| D382,676 S | 8/1997 | Holbrook | |
| 5,870,788 A | 2/1999 | Witkin | |
| D412,224 S | 7/1999 | Adler | |
| D420,175 S | 2/2000 | Garrels, Jr. | |
| 6,116,839 A | 9/2000 | Bender et al. | |
| 6,119,634 A | 9/2000 | Myrick | |
| D440,717 S | 4/2001 | Fazio | |
| 6,267,082 B1 | 7/2001 | Naragon et al. | |
| 6,269,508 B1 | 8/2001 | Younce | |
| 6,322,310 B1 | 11/2001 | Bender et al. | |
| 6,379,101 B1 | 4/2002 | Breaux | |
| 6,398,479 B1 | 6/2002 | Dupuy et al. | |
| 6,430,769 B1 | 8/2002 | Allen | |
| 6,463,613 B1 | 10/2002 | Thompson | |
| 6,722,721 B2 * | 4/2004 | Sherrer et al. | 14/71.1 |
| 6,747,212 B1 * | 6/2004 | Henry | 14/69.5 |
| 2003/0182740 A1 * | 10/2003 | Schmaltz et al. | 14/69.5 |

* cited by examiner

*Primary Examiner*—Teri Pham Luu
*Assistant Examiner*—Elizabeth Shaw
(74) *Attorney, Agent, or Firm*—Rosenberg, Klein & Lee

(57) ABSTRACT

The arched multi-segmented ramp assembly of the present invention has the advantageous qualities of being portable, lightweight, easily deployable and storable. Identical step links have keystone-shaped sides that abut adjacent members and are joined one to the other by knuckle-like hinges, both of which structural features impart to the unrolled assembly a gently arcuate contour, thereby enhancing the ramp's strength to weight characteristics compared to ramps of the prior art. The hinge connections further permit the ramp to be rolled up for easy transport and storage. Because of its modular design, the arched ramp may be assembled using varying numbers of component step-links, thus providing a user with the flexibility to form a ramp assembly with lengths suitable for different particular applications.

13 Claims, 9 Drawing Sheets

MULTI-SEGMENTED DEPLOYABLE ARCHED RAMP

FIELD OF THE INVENTION

The present invention is directed to load bearing structures which permit loading and access to be accomplished in a simple and effective manner. Still further, the subject invention pertains to load bearing structures which may be used to load weights from a base surface to a surface which is vertically displaced from the base surface. Still further, this invention is directed to a load bearing structure which may be interfaced with a ground surface on one end and a vehicle or a platform on the other end to allow loading of weights from the ground surface to the elevated surface. More in particular, this invention is directed to a ramp type structure which on one end may interface with the ground surface and on the other end, interface and be contiguous with a vertically displaced surface, as of a platform or of a vehicle for loading weighted material from the ground surface into the vehicle. More in particular, this invention is directed to a ramp structure which is portable and may be deployed upon the desire to load a weight onto a vehicle or platform. Further, this invention relates to a deployable arched ramp type structure which is formed in multi-segments for easy deployment for loading of a pet or other type animal from a ground surface to a vertically displaced surface.

Additionally, the subject invention pertains to a multi-segmented deployable arched ramp structure which may be rolled or folded into a compact volume when not in use. Still further, the subject invention is directed to a portable ramp structure which attains an arched or arcuate contour between a base surface and a vehicle surface to aid in its load bearing properties. Additionally, the subject invention directs itself to a multi-segmented deployable arched ramp which is formed of interdigitated segmental fingers or lug elements which are at least partially rotatable each with respect to the other to permit the arched ramp structure to be rolled into a compact volume.

Still further, the subject invention directs itself to a deployable arched ramp structure which permits ease in the loading or entry of a pet or other animal from a base surface which is vertically displaced from the vehicle surface or platform onto which the pet or other animal is being loaded. Additionally, the subject invention system is directed to a deployable arched ramp structure which is formed of lightweight plastic material members for ease of transportation of the arched ramp structure.

BACKGROUND OF THE INVENTION

Loading and unloading of domestic animals from vehicles is a somewhat difficult project for both the animal and the person who is loading the animal. A number of factors contribute to the difficulty of loading the animal into a vehicle or onto an elevated surface, which includes the weight of the animal; the elevation of the entryway; the age and mobility of the animal; the age and mobility of the animal owner; and the terrain from which the loading/unloading is taking place. Additionally, once loaded onto the vehicle or platform, there exists a need for compacting of the volume of the loading structure. The compaction of the volume allows for more space of the animal in the loaded vehicle and allows the loading structure to be transported to another site where the animal is to be removed from the vehicle.

There exists a need for a compact, lightweight, and structurally capable loading structure to assist in the loading and unloading of animals from vehicles or other such surfaces.

PRIOR ART

Ramps for permitting the loading and unloading of animals from mutually vertically displaced surfaces is known in the art. Some known ramps are currently available to assist an animal owner with loading and unloading tasks. However, a number of these prior art systems have limitations and still prove difficult for the animal owner in the loading and unloading process.

Some prior art loading ramps are rigid one or two-piece units fabricated from board planking or aluminum extrusions. In some cases, plastic fabricated loading ramps formed from plastic compositions with steel reinforcing rods for structural support have been used.

Single piece units are generally long, heavy and difficult to store when not in use and cannot be conformed to a low volume compact package.

Two-piece units may fold and are easier to store than single piece ramp structures; however, they still are heavy and cumbersome in their use.

The best prior art known to the Applicant includes U.S. Pat. No. 6,463,613; No. 6,430,769; No. 6,398,479; No. 6,322,310; No. 6,269,508; No. 6,116,839; No. 6,119,634; No. 5,870,788; No. 5,347,673; No. 5,062,174; No. 4,815,155; and, #D440,717.

U.S. Pat. No. 6,463,613 is directed to a portable and collapsible ramp system. However, the load bearing portion of the ramp is formed by a multiplicity of slats which are pivotally connected to one another by several flexible straps. Rigid support of the central ramp portion of this prior art system is provided by braces. However, this prior art portable ramp is severely limited in its load bearing capabilities and provides for a substantially planar extension of the portable ramp.

U.S. Pat. No. 6,430,769 is directed to a wheelchair ramp which includes a pair of ramp sections joined by a keyway joint connecting the ramp sections. This prior art system is representative of a rigid ramp structure which may be folded upon itself to bring some compactness to the overall volume, however, does not permit a rolling up of the ramp structure to minimize the storage volume. Additionally, this ramp is further representative of a planar extending ramp structure which does not utilize the arcuate or arched concept to increase the load bearing capabilities as provided in the subject system.

U.S. Pat. No. 6,398,479 is directed to a still further prior art lifting platform which is used generally for transporting a wheelchair passenger into and out of the rear door of a vehicle. This type of prior art ramp or platform is another example of a folding type platform which extends in a planar direction during use and does not include any arched or arcuate extension to aid in absorbing the load imparted thereto.

Thus, there still exists a need for a ramp type structure which is lightweight, is structurally capable of accepting the loads imparted thereon, which is lightweight for ease of deployment and has the ability of being rotatably compacted to allow storage in a small volume.

SUMMARY OF THE INVENTION

The need for a portable, lightweight, easily deployable and storable ramp is met by the arched multi-segmented structural walkway ramp provided in the present invention.

The arched ramp structure of the present system includes a concatenation of substantially identical structural sections or step links. Each of the links has a mechanism for hinged connection to adjacent sections. Structural stop features on the hinge elements are provided which impinge upon the adjacent sections when deployed. The assembled array of step links has the capability of pivoting and rolling up freely in a unitary direction, however, the ramp assembly 10 becomes a rigid arched bridge structure when unrolled and deployed into its operative position.

The load-carrying features of the arched structural walkway include a pair of opposing keystone-shaped side wall members formed on each step link that are designed specifically to cam up onto the identical features on adjacent step links, thereby providing load-bearing support. Additionally, each of the longer transverse sides of each step link has formed thereon a plurality of hinged knuckle members.

When fully deployed, the assembly is contoured into an arched form with concomitant improvement in strength-to-weight ratio compared to other foldable and rollable ramps. Each step link of the assembled structure has a shaped walking surface that may be textured for improved traction by the user such as the animal being loaded into the vehicle.

The ramp assembly is designed as an intermediate structure between a ramp and a ladder with raised cleat portions on the upper surfaces of the link steps adapted to provide an animal with an improved frictional surface to push against while walking up or climbing the ramp structure and alternatively, to support the animal's weight when the animal is descending from the vehicle. Each of the structural step links for the ramp assembly is envisioned in one embodiment as an injection molded plastic component for ease of manufacture and for minimizing the manufacturing costs. Alternative materials may be used to construct such an assembly with the important factor being that the materials used must have sufficient structural integrity to support the loads applied thereto.

The step links are connected each to the other along their respective extended or long transverse sides by interdigitation of the knuckle members within the hinge elements. The connection between adjacent step links is further stabilized by the use of an extruded hinge tube such as a plastic tubing—substantially flexible or rigid—that is passed through the channel formed by the openings of the substantially cylindrical knuckle members or knuckles. The open ends of a hollow extruded hinge tube are covered with an injection molded end cap that is seated in the openings of the channel formed by the co-linear knuckles on each transverse side of an assembly.

The first and last step link of the assembly include the knuckle-containing sides covered with a bumper or synonymously a foot portion, formed from an extruded elastomer and which may be secured adhesively to the ends of the assembly.

When deployed, the assembly forms an arched structure with a gentle convex arcuate profile or contour which imparts to the assembly a relatively increased weight-bearing capability while maintaining the weight of the structure in a minimized condition. This relatively increased weight-bearing of the assembly may be attributable at least in part to the keystone-like shape of each of the compression members. Rather than sagging in the middle as weight is applied to a flat ramp typical of the prior art, the ramp assembly 10 disperses the force of the applied weight by transferring that force through the compression members 25 along adjacent step links 20 and maintaining an arcuate contour 71.

The modular component design of the present invention permits freedom to manufacture assemblies to suit particular applications. For example, an assembly of fifteen step links can provide ingress/egress from most automobiles. Alternatively, in another preferred embodiment, an assembly of nineteen step links may be used for ingress/egress from a larger SUV-type vehicle.

Assemblies of different lengths defining different numbers of step links may be manufactured or fabricated at the factory and may be sold as a given length for a given end use.

In another preferred embodiment, an extension kit permits an end user with a first number of sections assembly to add a further set of sections assembly and extend the concatenation of step links.

In another preferred embodiment, the assembly may be formed from a stronger material such as die cast aluminum alloy. In a still further alternative embodiment, such assembly may be used in pairs to form a stronger roll-up ramp to be used for loading and unloading of all-terrain vehicles, garden tractors, wheelchairs, and the like onto and off of a vehicle such as a pickup truck.

As an example, the width of each link and therefore the width of the assembly may be in the range of approximately 6—18 inches. The preferred embodiment of this invention supports a weight load of approximately 200 pounds, at least. Individual arched ramp assemblies may be designed to support various loads that exceed the 200 pound limit, insofar as the weight carrying capacity of the ramp assembly is a function of the basic materials used in its manufacture.

DESCRIPTION OF THE PREFERRED EMBODIMENTS

Figure 1A:
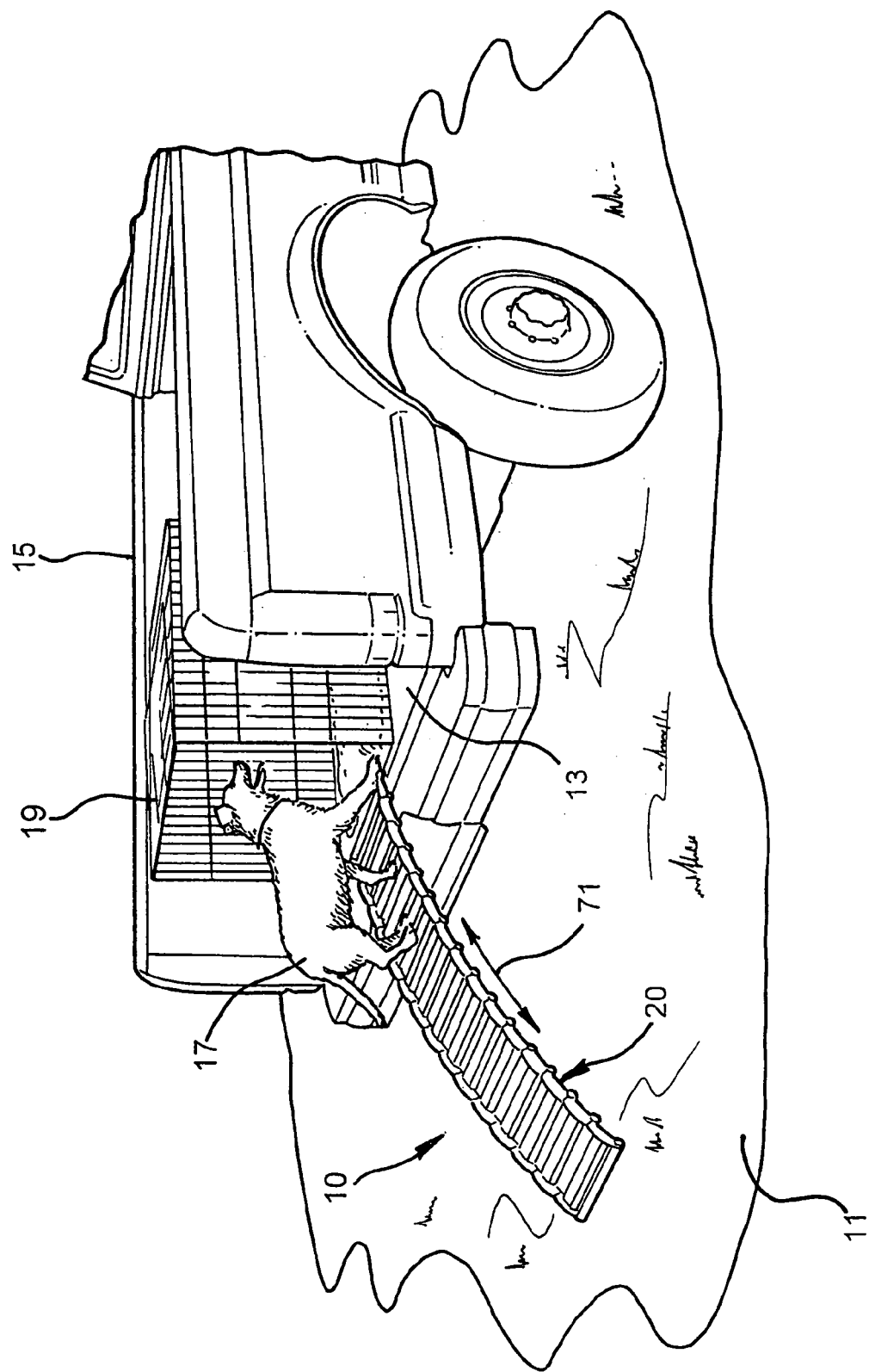
FIG. 1A is a perspective view of the deployed multi-segmented arched ramp showing an animal being loaded onto a pickup truck.

Referring now to FIG. 1A, there is shown multi-segmented deployable arched ramp assembly 10 for aiding in the loading of animal 17 from a base surface 11 which may be the ground to the bed base surface 13 of vehicle 15. Animal 17 may be loaded in directly into the bed of vehicle 15 or guided easily into cage 19 mounted on the bed base surface 13 of vehicle 15.

Figure 1B:
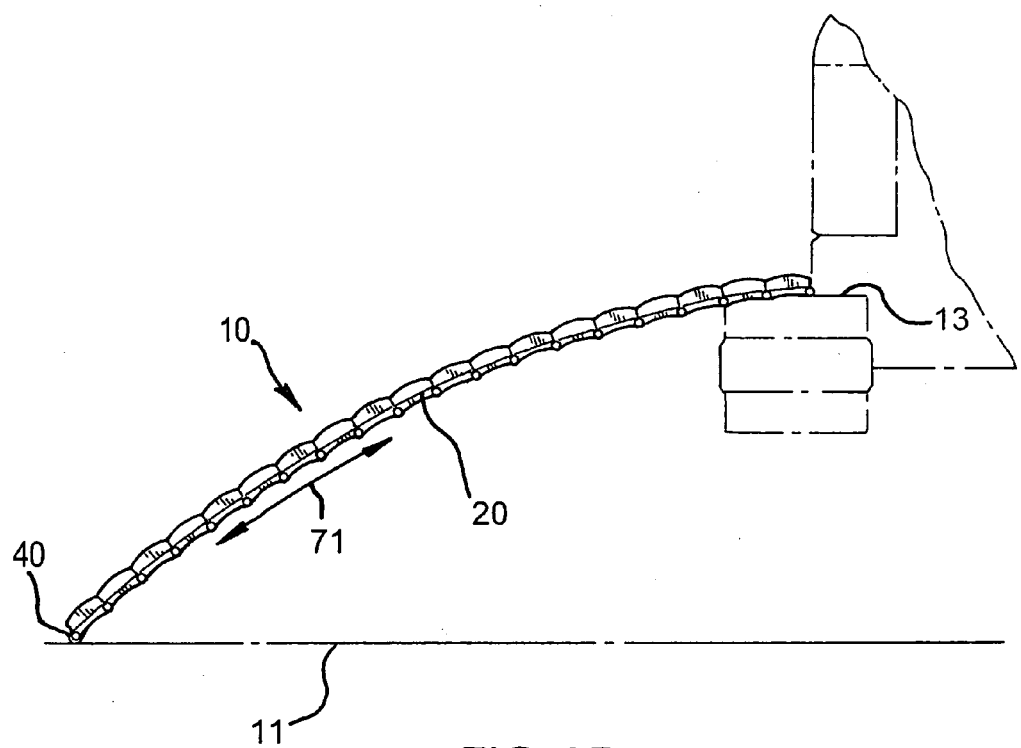
FIG. 1B is an elevational view of the multi-segmented deployed arched ramp of the subject invention.

As can be seen in FIGS. 1A and 1B, multi-segmented deployable arched ramp assembly 10 when in the fully deployed contour or condition is arcuately directed or assumes a gently arched profile as depicted by arcuate directional arrow 71. As will be seen in following paragraphs, the deployment of deployable arched ramp 10 permitting the arcuate profile permits the load from one step link member 20 to be absorbed somewhat and imparted to adjacent step link members 20 to increase the load bearing capability of the overall assembly 10. The arched structure of the unfolded or deployed assembly 10 shown in FIGS. 1A and 1B provides for an increased weight-bearing capability to ramp assembly 10 improving the strength-to-weight ratio of the present invention compared to prior art ramp assemblies.

It is to be understood that two important objectives of the present invention are to provide both a weight bearing ramp suitable for loading pets and/or other such animals onto a vehicle and further has the objective of being foldable, portable, and providing material qualities which allow for a lightweight overall assembly 10. The arched or arcuate form of the ramp assembly 10 in its deployed state may be further appreciated by reference to the side-views of FIGS. 1A, 1B, and 7, and is achieved by limiting the extent to which each component step link member 20 can be rotated with respect to its adjacent step link members 20'. The particular elements of the present invention that constrain the limitation of rotation of one step link member relative to its adjacent step link members will be discussed in greater detail below.

Further illustrated in FIGS. 1A and 1B is the segmental nature of the ramp assembly 10, which is comprised of a concatenation of step link members 20 that are hingedly joined along their adjacent longitudinal sides.

Figure 2A:
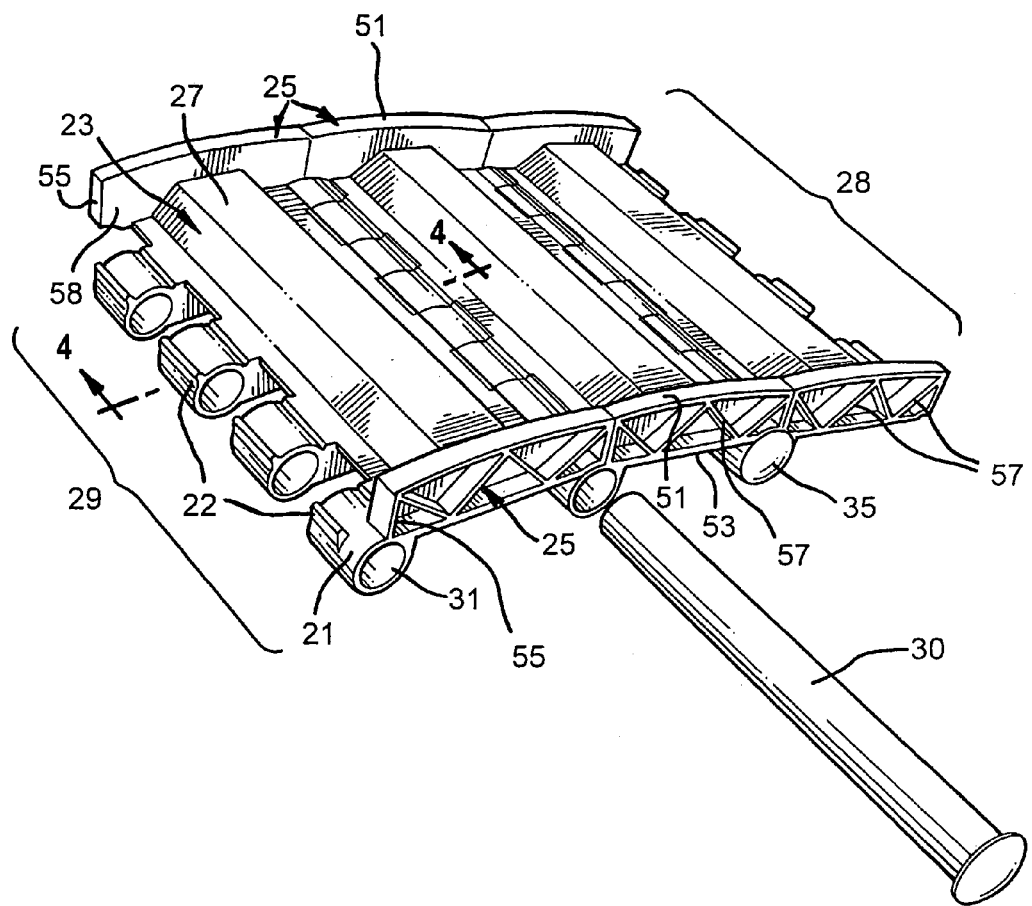
FIG. 2A is a perspective view of three joined step links of the subject deployable arched ramp including a blowout of a hinge pin.
Figure 2B:
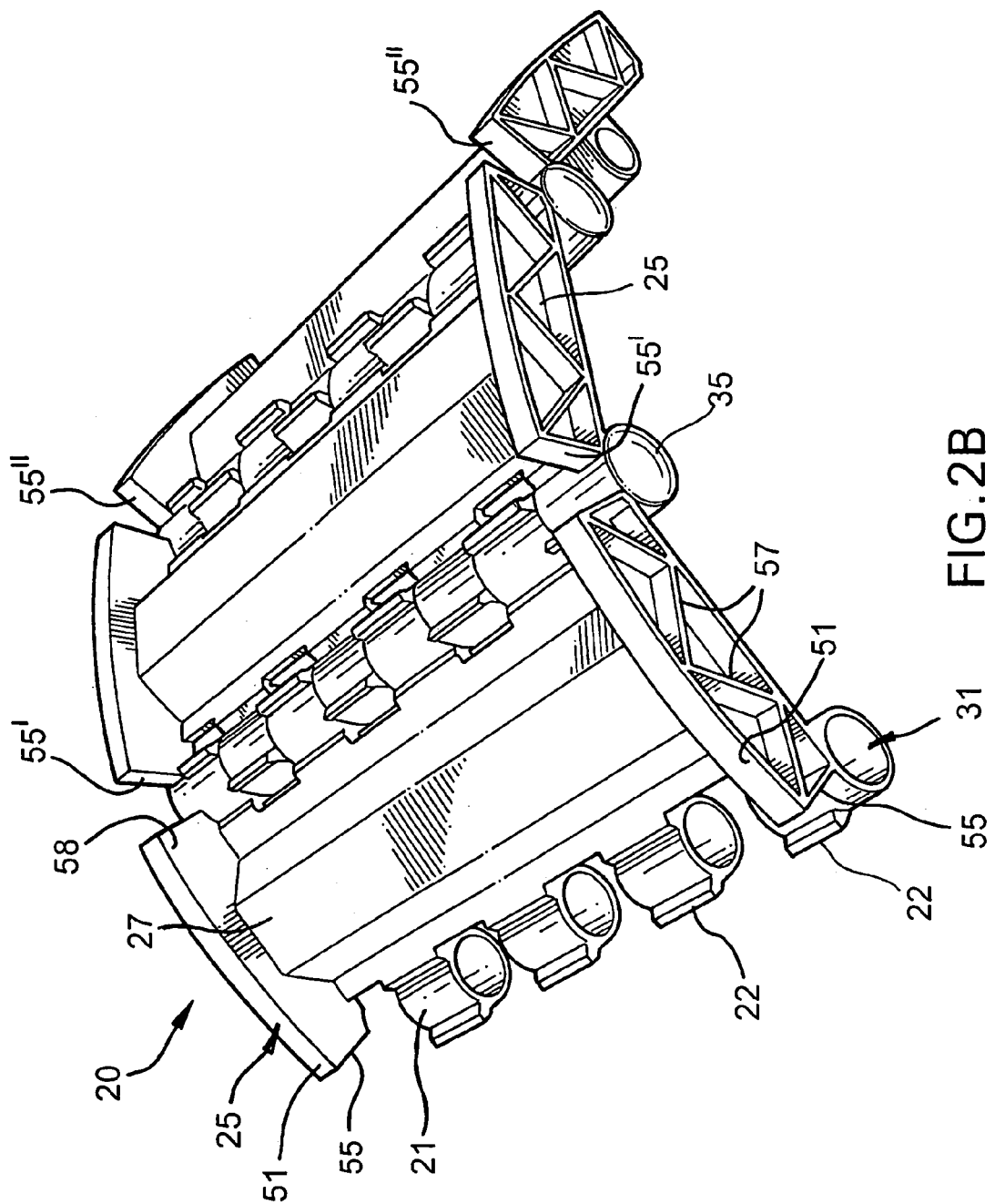
FIG. 2B is a perspective view of the arched ramp partially in a rotated position.
Figure 3:
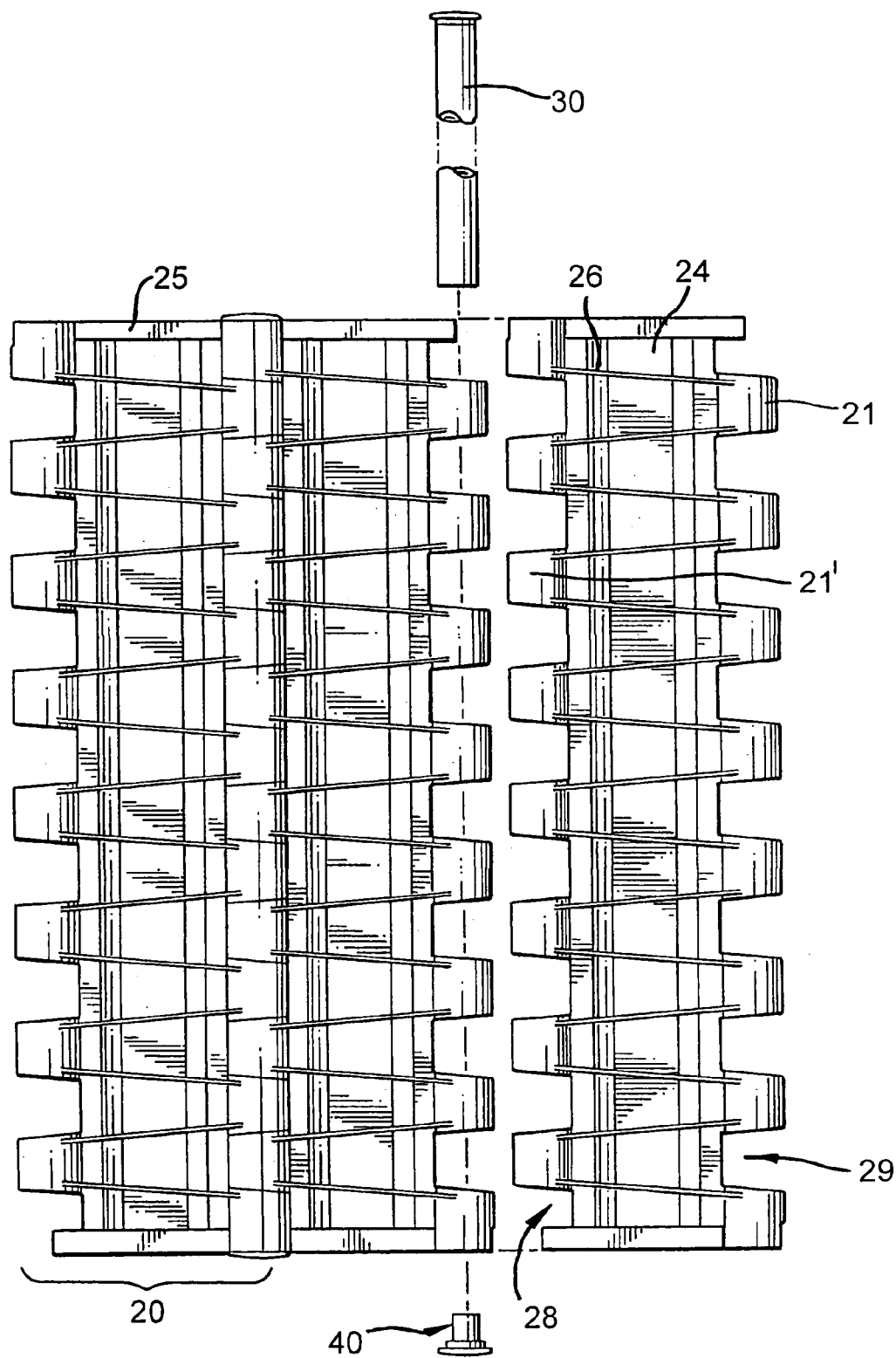
FIG. 3 is a bottom view of three joined step links of the deployable arched ramp of the subject invention.

The nature of each component step link 20 may be appreciated by reference to FIGS. 2A, 2B, and 3, in which three step links are shown joined together. All component step link members 20 are substantially identical in the preferred embodiment. A step link member 20 functions as a stepping surface, which in the preferred embodiment has a roughly rectangular shape, with one step link member 20 connected to adjacent step link members 20' along the longer side of the rectangle. Each step link member 20 is comprised of an upper surface 23 and a lower surface 24, which in the preferred embodiment are two opposite sides of a unitary piece. The step link member 20 of the preferred embodiment has formed on its upper surface 23 a cleat 27 for improving the traction of the surface on which a pet 17 would be walking. The raised cleat 27 on the arcuate deployed assembly 10 accomplishes this improved traction by functioning to some extent as a ladder step whereon an animal 17 may place its paw on the raised cleat 27 and push off it so as to advance successively from one step link member 20 to the next step links.

On either side of the step link member 20, that is, on its opposing transverse sides, compression members 25 are formed that extend upward in a substantially perpendicular orientation relative to the upper surface 23 of the step link member 20.

Figure 4:
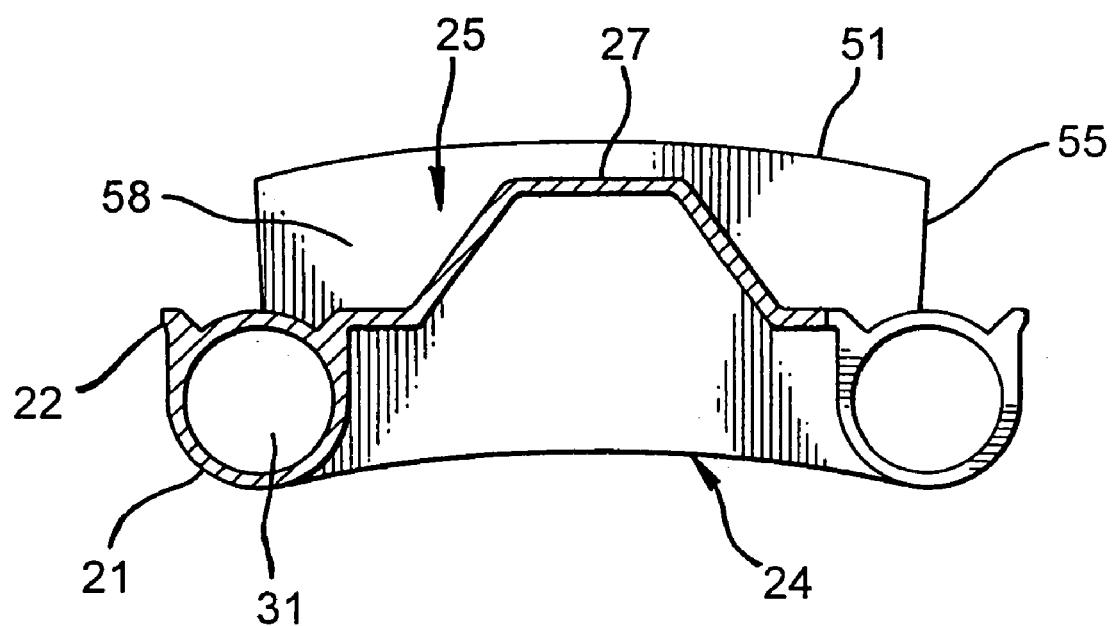
FIG. 4 is a cross-sectional elevational view of a step link taken along the cross-section Line 4—4 of FIG. 2A.

Each compression member 25 has a roughly horizontal upper side 51 substantially parallel to a lower side 53 that are both connected to the two roughly vertical abutment sides 55. The length of the upper side 51 is greater than the length of the lower side 53, thereby imparting a roughly keystone shape to the profile of the compression member 25, as illustrated in FIG. 4. The compression member sides 51, 53, 55 need not be straight but may be formed with an arcuate contour; in such cases the distance between the vertices where the upper side 51 connects with the vertical abutment sides 55 is greater than the distance between the vertices where the lower side 53 connects with the vertical abutment sides 55.

The compression members 25 connect to opposite transverse sides of the step link member's 20 upper surface 23 along the compression member's lower side 53. In a preferred embodiment of the ramp assembly 10, the compression members 25 are formed with a plurality of truss elements 57 that connect the upper side 51 and the lower side 53 in an oblique manner, dividing the recess formed by the compression member sides 51, 53, 55 into roughly triangular shaped spaces. There is also provided in the preferred embodiment an inner wall element 58 that further defines a compression member recess and connects all of the compression member sides 51, 53 and 55. The inner wall element 58 may be omitted or modified in other embodiments of the present subject invention.

It may be further appreciated with reference to FIGS. 2A and 4 that by having the upper side 51 longer than the lower side 53 the abutting of adjacent vertical abutment sides 55 of the step link members 20 in the course of deploying the ramp assembly 10 prevents the step links 20 from assuming a co-planar relationship and imposes thereby the arched or arcuate profile 17.

The hinge elements of each step link member 20 are formed along each of the longitudinal sides of a step link member 20 and comprise a plurality of substantially cylindrical shaped knuckle members 21. The number of knuckles of the hinge mechanism of ramp assembly 10 may be varied according to a particular embodiment; in the preferred embodiment there are eight knuckles 21 on each articulating longitudinal side of a step link member 20. This number of knuckles 21 is illustrated in FIG. 3; a hinge mechanism with the four knuckles 21 shown on the other illustrated step link members represents an alternative embodiment and is not in any way meant to constrain or limit the number of knuckles formed on a step link member 20.

The knuckle members 21 are regularly spaced along the longitudinal sides of a step link member 20, and oriented longitudinally so that their substantially cylindrical central bores 31 are in alignment. As may be further appreciated by reference to the Figures, the different positioning of the knuckles 21 distinguishes one longitudinal side of a step link member 20 from its opposite longitudinal side, whereby the positioning of the regularly spaced knuckle members 21 is adapted so that the knuckle members 21 of one step link member 20 may complementarily interdigitate with the knuckle members 21' of an adjacent step link member 20'. When juxtaposed, as seen in FIG. 2B, the interdigitating knuckle members 21 form a channel 31 that constitutes an axis of rotation for one step link member 20 relative to an adjacent step link member 20'.

There is formed on each knuckle member 21 a transversely oriented protrusion stop member 22 which is also seen in FIG. 4. When a step link member 20 is rotated in an unfolding direction relative to its adjacent step link member 20', the range of excursion is limited by the abutment of protrusion stop member 22 with upper surface 23' of the adjacent step link member 20'. The placement of the protrusion stop members 22 is in a location to partly constrain the unfolding rotation of the ramp assembly 10 and results in an arched, non-co-planar contiguous relationship between adjacent step link members 20, 20'. This non-co-planar relationship between adjacent step links 20 is mildly convex up, and imparts to the unfolded ramp assembly 10 its arcuate profile. In contradistinction to the unfolding condition, a folding rotational movement of adjacent step link members 20 is not constrained by the protrusion stop members 22, thereby permitting the ramp assembly 10 to be rolled into the portable compact condition illustrated in FIG. 6.

The transverse channel 31 formed by the co-linear interdigitated knuckle members 21 houses a hinge pin 30, seen in FIG. 2A, which maintains the contiguous relation between adjacent step link members 20 during rotational movement. Without the hinge pin 30 holding adjacent step link members 20 in contiguous relation, the step link members 20 would separate upon the folding rotation as described above. In the preferred embodiment, the hinge pin 20 is comprised of a lightweight hollow plastic tube and has seated in each of its open ends an end cap 35.

The lower surface 24 of each step link member is illustrated in FIG. 3, showing two step link members 20, 20' hingedly joined on the left and a third step link member 20" aligned so as to permit the hinging connection of that third step link member 20" to the middle step link member 20'. The interdigitation of the knuckle members 21 is permitted by this alignment and hinge pin 30 is shown in alignment with the channel 31 formed by the co-linear cylindrical knuckle members 21 and further indicated in FIG. 3 by an interrupted dotted line.

In the preferred embodiment illustrated, the lower surface 24 of each step link member 20 has formed thereon a plurality of support ribs 26 that are truss elements which give strength and augmented weight-bearing capability to the step link members 20. In the preferred embodiment as illustrated in FIG. 3, each of the support ribs 26 extends in a substantially longitudinal direction, extending from a longitudinal side contiguous with the knuckle member 21 to its opposite side. Alternating support ribs 26 are seen to be approximately parallel to each other in this preferred embodiment, but other arrangements of the support ribs 26 may be provided in other embodiments, or omitted altogether depending on the materials used and the anticipated function of the ramp assembly 10.

The arched form of the ramp assembly 10 in its open deployed state is accomplished both by the action of the protrusion stop members 22 to constrain rotation of adjacent step link members 20, as well as by the abutting of the vertical abutment sides 55 of adjacent compression members 25 one to the other. The difference in lengths between the upper side 51 and the lower side 53 of each compression member 25 constrains the opening or, equivalently, the deploying rotation of the step link members 20 by the abutting juxtaposition of a pair of vertical abutment sides 55 of the compression members 25 of one step link member 20 with the adjacent pairs of vertical abutment sides 55' of compression members 25' of step link members 20'. It can thus be appreciated that the ramp assembly 10 in its deployed state is constrained to its gently arched form by two important elements of the preferred embodiment, namely, the keystone shape of abutting compression members 25 as well as the positioning of the protrusion stop members 22 formed on the outer surfaces of the knuckle members 21.

The ramp assembly 10 in its deployed condition has one end resting on a base surface 11 and the other end on the vehicle bed surface 13. Since the assembly 10 in its preferred embodiment is made of a relatively hard plastic, or in other embodiments even harder material, the ends are fitted with elastomeric bumpers 40 that fit onto the step link ends. By fitting the ramp's ends with these bumpers, it is less likely that use of the ramp assembly 10 may scratch or mar either of the surfaces bridged by the ramp assembly 10. Furthermore, by making an elastomeric bumper 40 the element in contact with these surfaces, it is much less likely that the ramp assembly 10 can slip out of proper position which would endanger an animal 17 using the ramp 10 as well as possibly damage the vehicle 15 and or floor 11.

Figure 5:
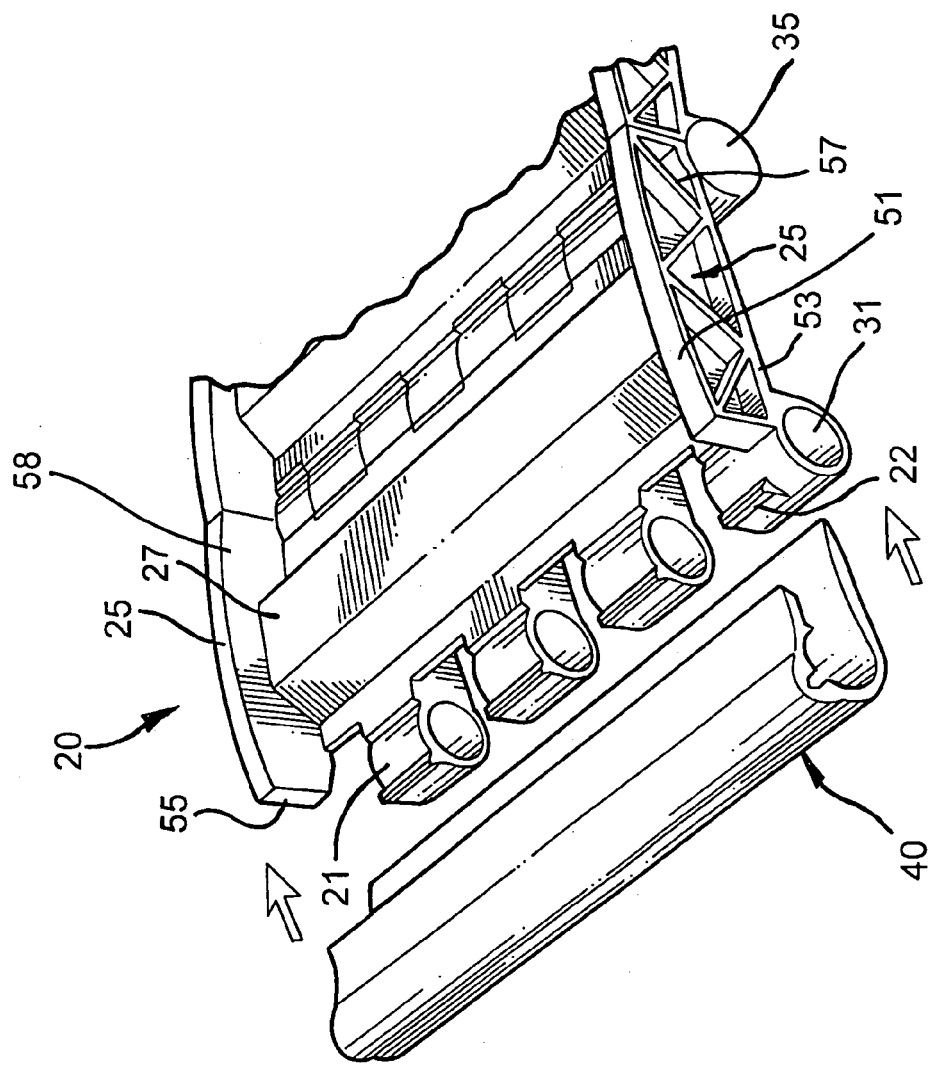
FIG. 5 is a perspective view, partially cut-away, of an end step link and a bumper member of the subject invention system.

FIG. 5 illustrates the location and function of a bumper 40, a unitary piece formed and adapted to fit in a contiguous protective manner over the row of knuckles 21 formed on an end step link member 20. In the preferred embodiment, such a bumper 40 is made of a resilient elastomeric material. The upper and lower bumpers provide the contact surfaces at the two ends of each arched ramp assembly 10 where the arched ramp assembly 10 makes contact with the two surfaces that it is bridging. Bumpers 40 in the preferred embodiment are adhesively joined to the end step link members 20, but other ways of securing the bumpers 40 in a contiguous relationship to the knuckle-bearing longitudinal sides are not precluded for other embodiments.

Figure 6:
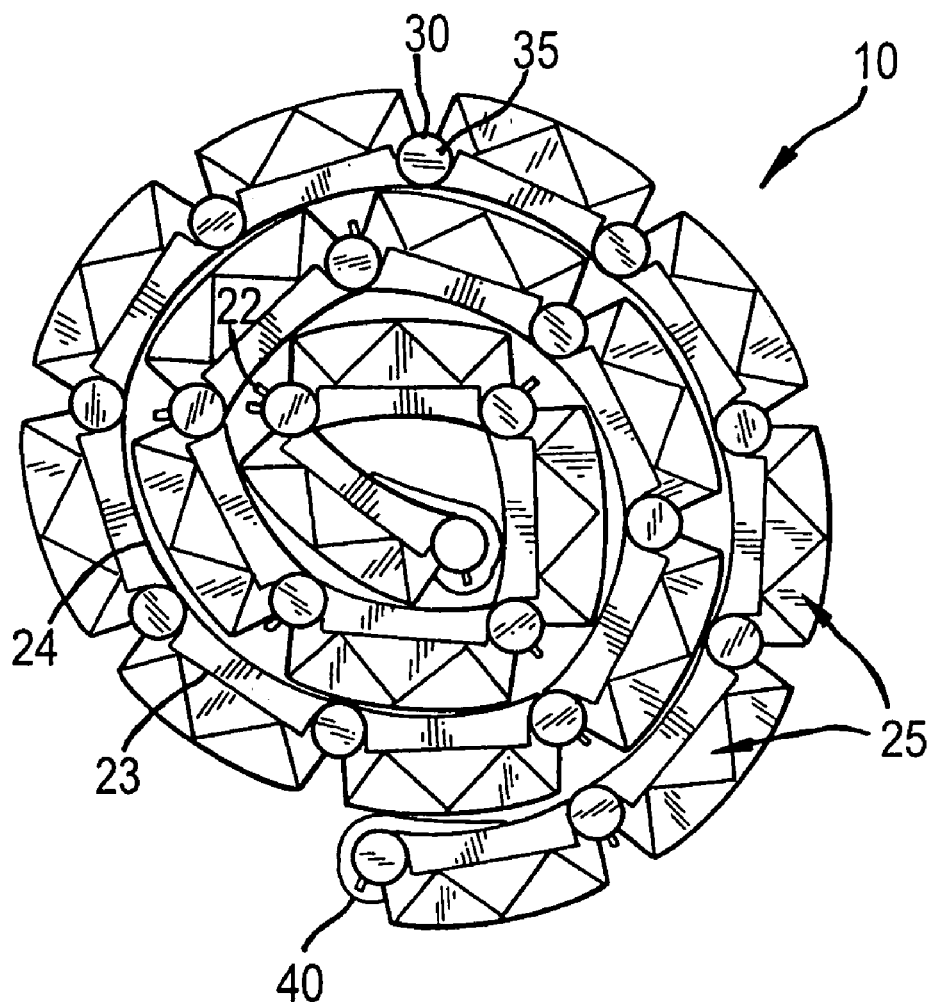
FIG. 6 is an elevational view of the multi-segmented deployable arched ramp of the subject invention in a rolled or compacted condition; and, FIG. 7 is a perspective view of two multi-segmented deployable arched ramps in deployment from a base surface to the bed of a vehicle.

An important objective of the present invention is a ramp that is portable. By making the ramp 10 with rotatable step links, a user may unroll the ramp when desiring to transfer an animal 17 into or out of a vehicle 15. Once this has been accomplished, the ramp assembly 10 is easily rolled back into the compact condition for ease of transport and efficiency of storage. FIG. 6 illustrates the rolled-up condition of a ramp assembly 10, the state in which the ramp assembly 10 is to be stored or carried. In a preferred embodiment, the folded rolled-up ramp assembly 10, with bumpers 40 and nineteen joined step link members 20, assumes a roughly cylindrical shape with an outer diameter of approximately 15". The ramp assembly 10 with fifteen joined step link members 20, has an approximately 13" outside diameter when in a rolled-up condition.

While the preferred embodiment of the present invention is directed to its use for transferring animals 17 to and from vehicles 15, the structure may be applied with insubstantial modifications for other tasks requiring greater weight bearing capability, but modified dimensions to suit other intended functions. For example, stronger materials may be used for moving heavier objects or animals, but those stronger materials usually weigh more than plastic; the intended function may not require the same width as the preferred embodiment however, so narrower ramps 10 may be used that serve the purpose and keep the weight at a minimum.

Figure 7:
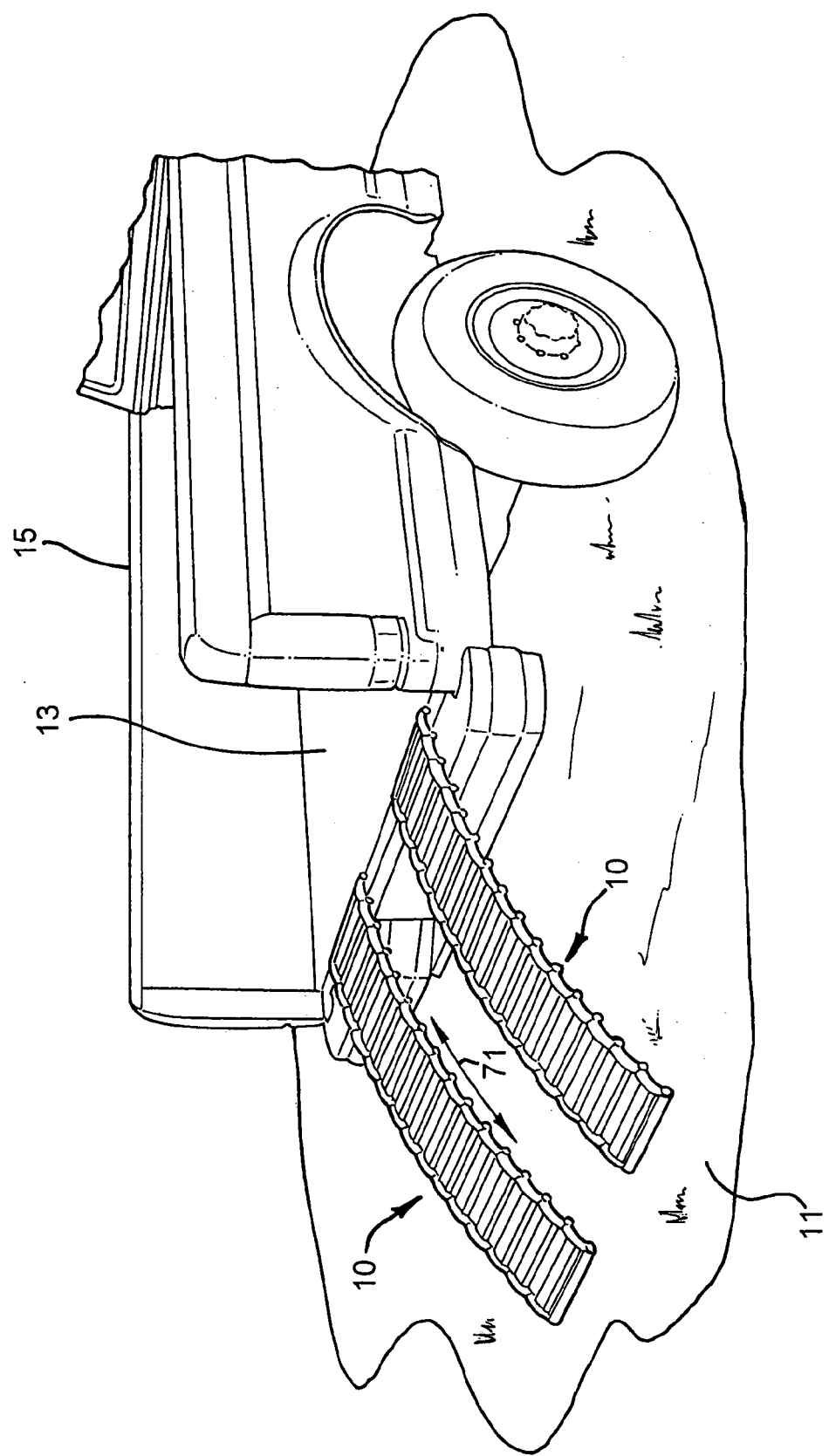

The preferred embodiment of the present ramp assembly 10 is formed with a relatively hard plastic, except for the bumpers 40 that are made from an extruded piece of EPDM or similar elastomer. In another possible embodiment the component step link members 20 of the ramp assembly 10 may be formed from a stronger material, such as die cast aluminum alloy, and further formed so as to make the width of each step link member 20 approximately 8". When used in pairs, such a narrower and stronger ramp assembly is suitable for loading and unloading all-terrain vehicles, garden tractors, or the like, onto and off of a pick-up truck or the like. This alternative embodiment is illustrated in FIG. 7.

In another preferred embodiment, the present invention encompasses a mounting bracket to permit a user to firmly affix one end of the ramp the end or underside of a table or platform, so as to permit a user to roll the deployed ramp into the compacted condition and to reversibly strap or otherwise secure the rolled up ramp under the table or platform in a manner that makes it convenient and easy to re-deploy the arched ramp assembly as needed.

An alternative embodiment of the present invention is formed with means for reversibly joining two or more such arched ramp structures side-by-side so as to permit a user to assemble an arched ramp structure with a width equal to the number of component arched ramp structures times the width of an individual arched ramp structure. Such means may encompass a clip, a Velcro™-type system, or other reversible joining means.

While the present invention has been shown and described in terms of a preferred embodiment thereof, it will be understood that this invention is not limited to this particular embodiment and that many changes and modifications can be made without departing from the true spirit and scope of the invention as defined in the appended claims. In addition, as used herein and in the claims, such words as "upper", "lower", "top", "bottom", and "side", and the like are used in conjunction with the Drawings for the purposes of clarity, and it will be appreciated that they do not limit the device to a particular orientation.

What is claimed is:

1. A portable foldable arched ramp assembly comprising:
    (a) a plurality of adjacently positioned step links, each of said step links having a pair of compression members formed on opposing transverse ends of said step links, each of said plurality of step links including:
        (i) an upper surface wherein said compression members extend substantially perpendicular from said upper surface;
        (ii) a lower surface with a plurality of support ribs formed thereon extending from a first longitudinal side to a second longitudinal side,
        (iii) a plurality of regularly spaced substantially cylindrical knuckles formed on each of said longitudinal first and second sides and adapted to permit said knuckles formed on a first longitudinal side to complementarily interdigitate with said knuckles formed on a second longitudinal side of an adjacent step link, each of said substantially cylindrical knuckles having a channel transversely formed therethrough; and
        (iv) a plurality of protrusions, each formed on an outer surface of each of said plurality of knuckles, said protrusions being oriented in a substantially transverse direction and positioned to abut the transverse side of an adjacent step link when said assembly is fully deployed so as to impart a non-planar relation between contiguous step links; and,
    (b) a plurality of hinge pins respectively passing transversely through said channels of corresponding substantially cylindrical knuckles of said plurality of step links for permitting connection of and rotation of one of said step links with respect to an adjacent one of said step links, said pair of compression members of one of said step links abutting said pair of compression members of an adjacent step link when said adjacent step links are rotated to a pre-determined angle, thereby fixedly positioning adjacent contiguous step links one to the other.

2. The arched ramp assembly as recited in claim 1, wherein each of said compression members is comprised of an upper side with a pair of upper ends and a lower side with a pair of lower ends, and a pair of vertical abutment sides with a top end and a bottom end, so that said top ends of said vertical abutment sides connect to said upper ends of said upper side and said bottom ends of said vertical abutment sides connect to said lower ends of said lower side, wherein a distance between said upper ends is greater than a distance between said lower ends, imparting to said compression members a keystone shaped profile, and the vertical abutment sides of said compression members of a first step link abut the vertical abutment sides of said compression members of an adjacent step link so as to impart to said ramp assembly an arcuate profile with a pre-determined radius of curvature in the range of 80 to 125 inches.

3. The compression members as recited in claim 2, wherein each of said compression members further comprises a recess defined by said upper surface and said lower surface and said vertical abutment sides, said recess divided by a plurality of truss elements each of which connect to said upper side and said lower side, and forming thereby an open truss structure.

4. The compression members as recited in claim 3, further comprising a wall member consisting essentially of a surface with a pair of substantially horizontal edges connected to said upper side and to said lower side, and a pair of substantially vertical edges connected to said vertical abutment sides of said compression members, wherein said wall member is positioned medial to and integral with said truss elements.

5. The arched ramp assembly as recited in claim 1, wherein a first bumper member is fixedly attached to a first end of said assembly and a second bumper member is fixedly attached to a second end of said assembly, said first and second bumper members on said assembly being positionable between a first surface and a second surface respectively.

6. The arched ramp assembly as recited in claim 1, wherein each of said plurality of hinge pins further comprises a tube with a length substantially equal to a width of said step links, and a pair of endcaps wherein each of said endcaps is adapted to be seated on an end of said tube.

7. The arched ramp assembly as recited in claim 1, wherein said assembly is made from a material chosen from the group consisting of plastic, glass, elastomer, carbon fiber, metal alloy, wood, and a combination thereof.

8. The arched ramp assembly as recited in claim 1, wherein said ramp assembly further comprises a number of step links in a range of 12 to 20.

9. The arched ramp assembly as recited in claim 8, wherein said folded rolled-up condition has an outside diameter in a range of 12 to 20 inches.

10. The arched ramp assembly as recited in claim 1, wherein each of said plurality of knuckles has formed on an outer surface a transversely oriented protrusion to restrict rotatory movement to an arched extended condition, and to permit an opposite rotatory movement to a folded rolled-up condition.

11. The arched ramp assembly as recited in claim 1, wherein said upper surface of a step link member further comprises a raised cleat portion adapted for increasing traction of a user.

12. The arched ramp assembly as recited in claim 1 further comprising means for reversibly joining along a longitudinal aspect a first arched ramp assembly to a second arched ramp assembly.

13. The arched ramp assembly as recited in claim 1 further comprising a mounting means connected to an end of said arched ramp assembly to be reversibly secured to a platform, for reversibly and fixedly stowing said ramp assembly to said platform.

* * * * *

UNITED STATES PATENT AND TRADEMARK OFFICE
CERTIFICATE OF CORRECTION

PATENT NO. : 6,928,959 B1
DATED : August 16, 2005
INVENTOR(S) : Catharine W. Trauernicht et al.

It is certified that error appears in the above-identified patent and that said Letters Patent is hereby corrected as shown below:

Title page,
Item [76], Inventors, delete the name "Catherine Trauernicht" and insert therefore -- Catharine W. Trauernicht --.

Signed and Sealed this

Fourth Day of October, 2005

JON W. DUDAS
*Director of the United States Patent and Trademark Office*